United States Patent

Machado et al.

[11] 4,080,257
[45] Mar. 21, 1978

[54] BAFFLE-FORMER ARRANGEMENT FOR NUCLEAR REACTOR VESSEL INTERNALS

[75] Inventors: Octavio J. Machado, Pensacola; Robert T. Berringer, Gulf Breeze, both of Fla.

[73] Assignee: Westinghouse Electric Corporation, Pittsburgh, Pa.

[21] Appl. No.: 635,025

[22] Filed: Nov. 25, 1975

[51] Int. Cl.² .............................................. G21C 13/02
[52] U.S. Cl. ........................................ 176/87; 176/65
[58] Field of Search .................... 176/40, 50, 61, 65, 176/87

[56] References Cited

U.S. PATENT DOCUMENTS

| | | | |
|---|---|---|---|
| 3,205,144 | 9/1965 | Jabsen | 176/50 |
| 3,607,637 | 9/1971 | Marshall | 176/59 X |
| 3,720,581 | 3/1973 | Kaser | 176/87 |
| 3,816,246 | 6/1974 | Kumpf | 176/61 X |
| 3,821,079 | 6/1974 | Jabsen | 176/61 |
| 3,823,066 | 7/1974 | Thome | 176/50 X |

Primary Examiner—Peter A. Nelson
Attorney, Agent, or Firm—Edward L. Levine; Z. L. Dermer

[57] ABSTRACT

A baffle-former arrangement for the reactor vessel internals of a nuclear reactor. The arrangement includes positioning of formers at the same elevations as the fuel assembly grids, and positioning flow holes in the baffle plates directly beneath selected former grid elevations. The arrangement reduces detrimental cross flows, maintains proper core barrel and baffle temperatures, and alleviates the potential of overpressurization within the baffle-former assembly under assumed major accident conditions.

3 Claims, 6 Drawing Figures

BAFFLE-FORMER ARRANGEMENT FOR NUCLEAR REACTOR VESSEL INTERNALS

CROSS REFERENCE TO RELATED APPLICATIONS

Reference is made to the following applications assigned to the Westinghouse Electric Corporation and filed concurrently herewith:

1. Application filed in the name of R. T. Berringer and O. J. Machado entitled *Nuclear Core Region Fastener Arrangement*, Ser. No. 635,024, herein referred to as the Berringer/Machado application. The Berringer/Machado application may be referred to for a better understanding of the thermally induced stresses imposed upon core region baffling components and fasteners. This invention may be utilized in conjunction with the inventive teachings of the Berringer/Machado application.

2. Application filed in the name of B. T. Berringer entitled *Nuclear Reactor Core Flow Baffling*, Ser. No. 635,026, herein referred to as the Berringer application. The Berringer application may be referred to for a better understanding of coolant flow patterns through and about a nuclear reactor core and internals. This invention provides an alternative baffling arrangement to the inventive arrangement of the Berringer application.

3. Application filed in the name of F. W. Cooper et al entitled *Nuclear Core Baffling Apparatus*, Ser. No. 635,023, herein referred to as the Cooper et al application. The Cooper et al application may be referred to for a better understanding of baffling arrangements and thermal expansions. This invention may be utilized in conjunction with the inventive teachings of the Cooper et al application.

BACKGROUND OF THE INVENTION

1. Field of the Invention:

This invention relates to the reactor vessel internals of a nuclear reactor, and more particularly to a baffle and former assembly. The assembly alleviates the potential for detrimental overpressurization in the assembly under assumed major accident conditions, and reduces coolant cross flow impingement on the reactor fuel assemblies, by utilization of specially located formers and flow holes.

2. Description of the Prior Art:

A typical liquid cooled nuclear reactor includes a singular reactor vessel, housing the heat generating reactor core, and a plurality of flow loops through which the reactor coolant fluid is circulated. In each loop, coolant which is heated in the core typically is placed in heat exchange relation with a vaporizable fluid which is used to drive turbine-generator apparatus. The coolant is then recirculated to the reactor vessel. Within the vessel are the reactor vessel internals, the functions of which include support of the core components, such as the fuel assemblies, guidance of reactor coolant flow, and support of core monitoring apparatus. Most of the supported load is transmitted through the wall of the massive core barrel which surrounds the reactor core. Coolant flow generally enters the vessel, passes downward in an annulus formed between the barrel and vessel, and then is turned 180° to flow up through the core and out of the vessel. Between the core barrel and the core is typically a baffle plates-and-formers assembly, also supported by the core barrel, which confines and directs flow into the core region and also provides an annulus that shields the core barrel wall from excessive irradiation. The baffle plates abut against one another about the core, and gaps may form between the plates due to differential thermal expansions among the internals components. Coolant circulating through the baffles-formers assembly may therefore undesirably pass through the gaps and impinge upon the core fuel assemblies, resulting in detrimental local loadings on the assemblies.

Some internals designs have been based upon downward flow in the baffle-former annulus, the coolant entering at the upper portion of the annulus, passing vertically through holes in the formers, and exiting to turn 180° and pass through the core. Such designs have the advantage of alleviating core bypass flow, which bypass flow lessens the thermal efficiency of a reactor. However, some flow may still leak through the gaps between adjacent baffle plates into the core due to the high pressure differential between the baffle region and core, undesirably impinging in a cross flow fashion upon the fuel assemblies. Such cross flow can induce unacceptable fuel assembly vibration. More recent designs have therefore incorporated upward flow in the baffle-former annulus, such that in addition to the large flow of coolant upward through the core, a relatively small bypass stream passes in parallel through the annulus. This reduces the pressure differential and alleviates the tendency for leakage through the baffle plates. However, this design raises concerns with respect to the amount of flow through the annulus. It is desirable to minimize the flow, as its bypassing the reactor core results in lower reactor thermal efficiency. If the annulus is kept relatively open, by utilization of a large area of flow openings in the formers, an unacceptable bypass in excess of one to two percent could result. Minimizing the flow rate to a range which still provides adequate baffle, former, and barrel cooling, on the order of one-half percent of total flow during normal operation, raises concerns under assumed design-basis accident conditions. In the unlikely event of a rupture of the main coolant piping in one of the circulating loops, a rapid depressurization of the reactor system results, referred to as "blowdown". Under such conditions, the coolant in portions of the vessel will depressurize and flash to steam, including the coolant in the baffle-former annulus. With a baffle-former flow area that has been limited in order to increase efficiency, the core will depressurize faster than the annulus, and the flashing coolant could build up excessive pressures in the annulus. The overpressurization can damage the baffle assembly and also the adjacent fuel assemblies, potentially failing the fuel rods.

It is therefore desirable to have a baffle-former assembly which overcomes these deficiencies in the prior art and effectively incorporates the pressure differential benefits provided by an upward flow in the baffle-former annulus, the efficiency benefits provided by minimizing core bypass flow, and which further will eliminate the overpressurization concerns under assumed accident conditions.

SUMMARY OF THE INVENTION

This invention provides a baffle plates-and-formers assembly which overcomes the above-discussed deficiencies of prior art assemblies, and provides significant benefits during both normal and accident operating conditions. Further, it accomplishes these desirable results without major modifications of prior art baffle-former assemblies.

The effects of the invention include maintaining a bypass flow through the baffle-former annulus parallel to the upward core flow which adequately cools the baffle plates, formers, and core barrel, does not detract from reactor thermal efficiency, and controls cross flow through specially oriented holes in the baffle plates which will also relieve a pressure buildup in the unlikely event of accident conditions. In order to accomplish this, the formers are positioned at about the same elevations as the grids of the fuel assemblies. This places the high pressure drop areas in the core and the baffle-former annulus at similar elevations. Flow holes allowing fluid communication between the annulus and the core are incorporated in the baffle plates at locations just below the elevations of preselected grids and formers. Flow openings, as typical in the prior art, are also incorporated through the formers. The size and location of the baffle flow openings are controlled to minimize pressure differentials across the baffle plates, and thus minimize cross flow through the holes.

This control of the cross flow is achieved because both the grids in the core and the formers in the annulus present a large resistance to flow as respectively compared to the flow of coolant along the remainder of the fuel assemblies and along the remainder of the annulus. The holes in the baffle plates are thus located across the two relatively high resistance flow areas, and flow through the holes during normal operations is therefore minimized. Further, any cross flow from the baffle-former annulus would be at or about a grid location, which location is less likely to vibrate or cause fluidelastic excitation of the fuel rods.

Further, any pressure buildup during assumed accident conditions will be relieved by release of fluid through the holes in the baffle plates, thereby maintaining the integrity of the baffle-former assembly.

BRIEF DESCRIPTION OF THE DRAWINGS

The functions and advantages of this invention will become more apparent from the following description taken in connection with the accompanying drawings, in which.

DESCRIPTION OF THE PREFERRED EMBODIMENTS

Figure 1:
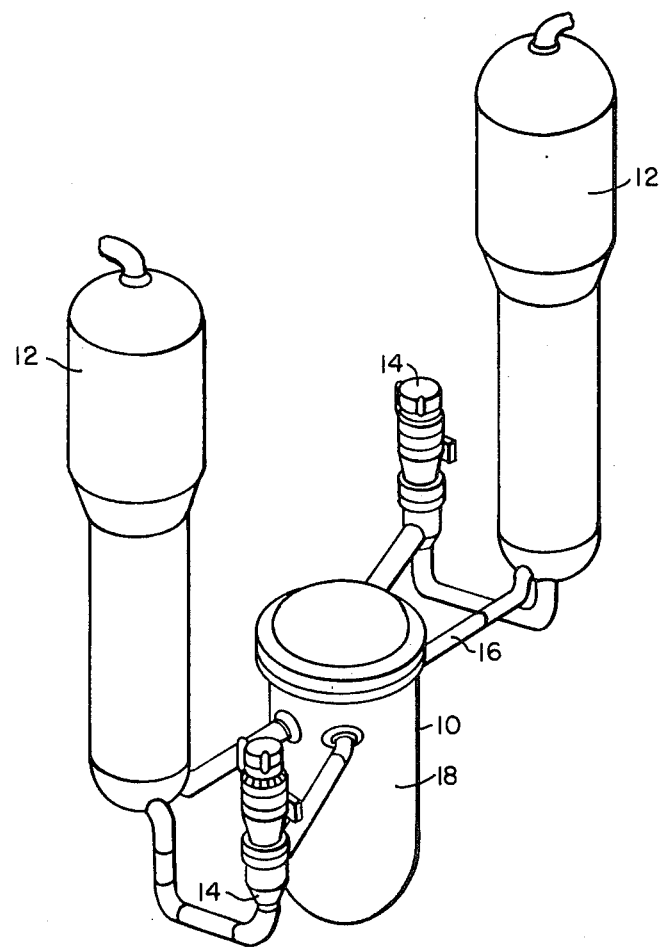
FIG. 1 is an isometric schematic of a primary coolant system of a nuclear reactor.

Referring to FIG. 1 there is shown a typical arrangement of a primary reactor coolant system for a liquid cooled nuclear reactor, also incorporating this invention. The major components shown include a reactor vessel 10, steam generators 12, reactor coolant pumps 14, and main coolant piping 16 connecting the components in the manner shown. A typical reactor coolant system includes a single reactor vessel 10, and a plurality of flow loops, each loop including a pump 14 and a steam generator 12. The power output of a plant is typically larger in those plants with additional loops, such as three-loop or four-loop arrangements. The system shown includes two loops, and coolant flow is generally from the reactor vessel 10, to the steam generator 12, to the pump 14, and returned to the vessel 10. Housed within the reactor vessel 10 are the reactor vessel internals and the nuclear core 18. The coolant picks up heat energy as it passes through the core 18, and transfers the energy at the steam generator 12 to fluid in other systems which fluid is typically vaporized to drive turbine-generator apparatus. A typical primary reactor coolant system operates at pressures of approximately 2250 psi. Other reactors may operate at lower pressures.

Figure 2:
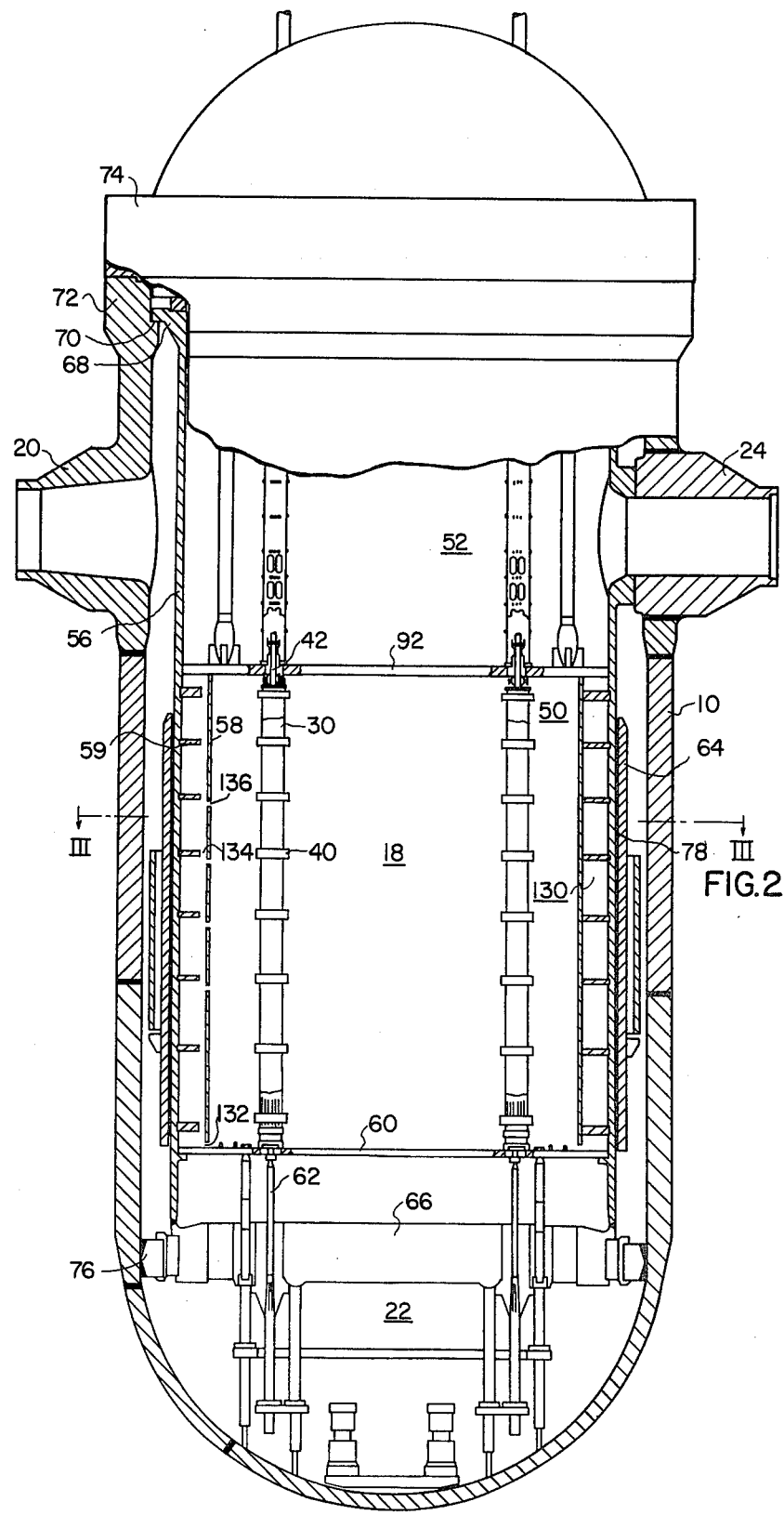
FIG. 2 is an elevation view, in cross section, of a reactor vessel and vessel internals.
Figure 3:
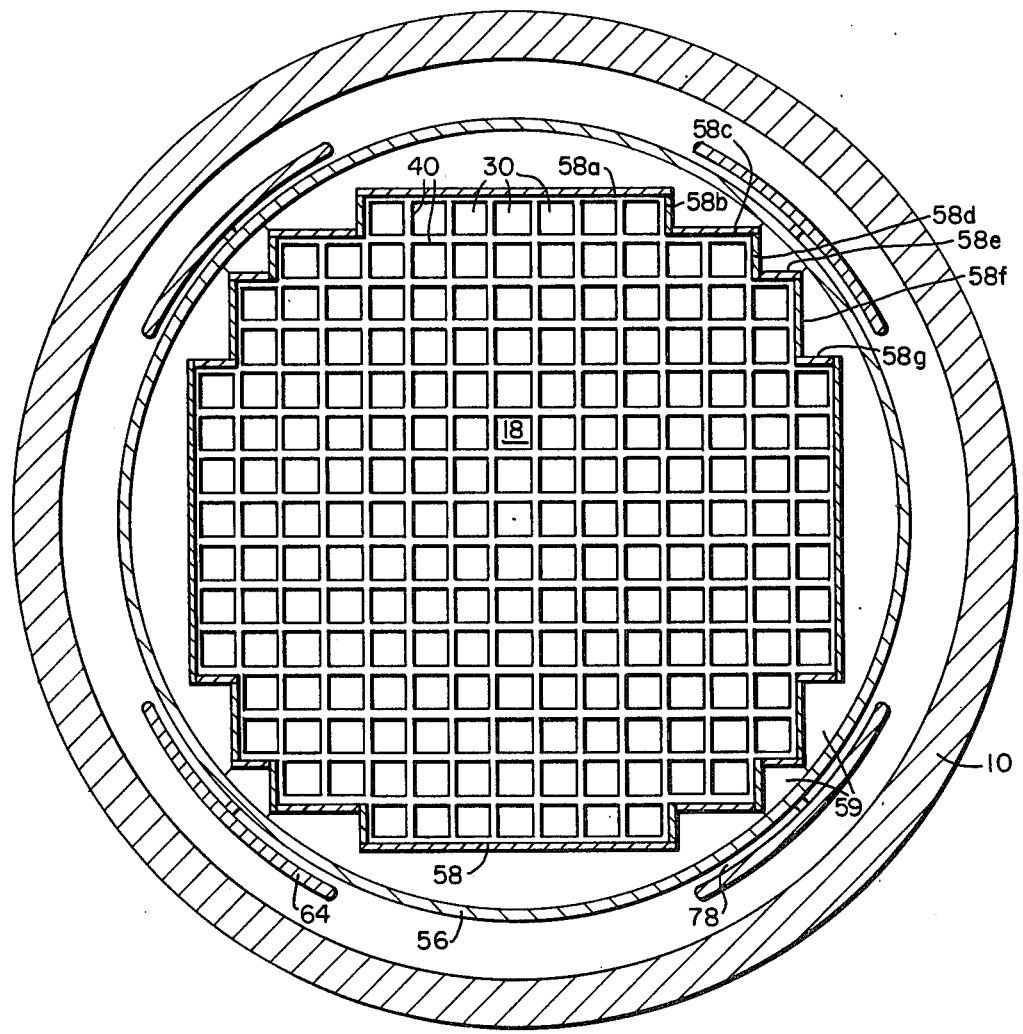
FIG. 3 is a plan view, in cross section, taken at III—III of FIG. 2.
Figure 4:
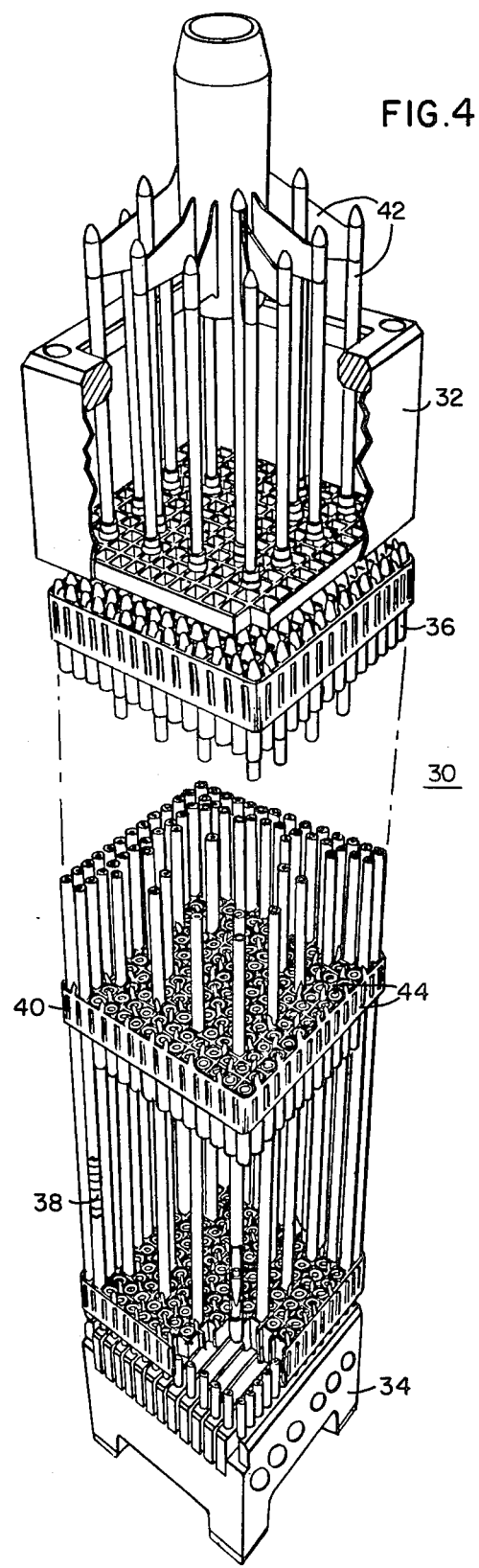
FIG. 4 is an isometric view of a typical nuclear fuel assembly.

The reactor internals and core 18 are shown, within the vessel, in FIG. 2. A typical core 18 includes a plurality of elongated fuel assemblies 30, disposed adjacent one another, so as to approach the configuration of a right circular cylinder, shown best in FIG. 3. A typical fuel assembly 30 is shown in FIG. 4, and includes an upper nozzle 31, a lower nozzle 34, and a plurality of elongated, generally cylindrical fuel rods 36 disposed between the nozzles 32, 34. The fuel rods 36 enclose a plurality of stacked fuel pellets 38 of enriched uranium dioxide or other nuclear fuel. The rods 36 are supported laterally by a plurality of fuel grids 40 along the assembly 30 length. The grids typically are of an "egg-crate" arrangement which allows axial expansion of the rods 36 while providing the lateral support. The grids 40 are typically composed of a plurality of straps 44, the outermost of which are the contact surfaces for any contact among adjacent assemblies. The grids 40 are therefore positioned at the same elevation in all of the fuel assemblies 30 within a given core 18. The fuel assemblies 30 shown in FIG. 2 have grids 40 spaced at eight elevations along the assembly length. It is to be understood, however, that the teachings of this invention are applicable to cores with any number of grids 40 along the assembly. Also shown inserted in the assembly of FIG. 4 is a control rod element 42 which is removably positioned within preselected assemblies of the core 18 to control the fissioning process.

For purposes of description, the components of the reactor internals may be divided into the lower core support structure 50 or lower internals, and the upper core support structure 52 or upper internals. The functions of the internals include supporting, aligning, and guiding core components, directing coolant flow to and from the core components, and supporting and guiding in-core instrumentation which provides indications of core conditions. The upper internals 52 support, or provide backup support, for the top of the core 18, and guide such components as the control rod elements 42.

The major containment and support member of the internals is the lower internals structure 50. It includes a core barrel 56, core baffle plates 58, core formers 59, lower core plate 60 and support columns 62, neutron shields 64, and a bottom support plate 66. The most typical material for construction of this structure is stainless steel. The lower internals is supported at the upper flange 68 of the core barrel 56, which seats on a ledge 70 of the reactor vessel flange 72. The vessel flange 72 also supports the reactor vessel head 74, which is bolted to the reactor vessel 10. The lower end of the lower internals 50 is restrained in lateral movement by a radial support system 76 attached to the vessel wall. The neutron shields 64 are affixed about the outer periphery of the core barrel 56, and function to protect the vessel 10, in the core area, from streaming neutrons. An annular space 78 is provided between the neutron shields 64 and the core barrel 56 to allow coolant flow along the barrel 56 exterior. Affixed to and within the core barrel 56 are the core formers 59 which support the vertical baffle plates 58 which enclose the radial periphery of the core 18. The baffle plates 58 abut against one another, held in position by the formers 59, so as to form a complete enclosure about the core, as shown in plan view in FIG. 3. The formers 59 and baffles 58 also provide a bypass coolant flow path through an annulus 130 between the core barrel and the baffle to cool the core barrel, baffles and formers. The term annulus, when used herein, refers to a bounded area, not necessarily circular in cross section. The lower core plate 60 is also supported by the core barrel 56 and is positioned to support and orient the fuel assemblies 30. The lower core plate 60 is perforated for flow purposes and includes means, such as pins, to properly orient the assemblies 30.

During operation, the main flow of reactor coolant enters the reactor vessel 10 through a plurality of vessel inlet nozzles 20, passes downward about the outer periphery of the core barrel 56 and about the neutron shields 64, and is then turned one hundred and eighty degrees in the region below the bottom support plate 66, the lower plenum 22. It then passes upward through openings in the bottom support plate 66 and lower core plate 60, and upwardly through and about the fuel assemblies 30, where it cools the core and absorbs heat energy. It then passes through openings in the upper core plate 92, is turned ninety degrees, and exits through a plurality of vessel outlet nozzles 24, to give up heat energy at the steam generators 12.

Similarly, the relatively small coolant bypass flow, preferably on the order of one-half percent of the flow through the core 18, enters the annulus 130 from below the bottom 132 of the baffle plates 58. It then passes generally upward through the flow openings 134 in the formers 59. In the preferred embodiment of this invention the formers 59 are positioned at the same elevations as the grids 40 of the fuel assemblies 30. This places the areas of high resistance to the parallel and upward coolant flow at the same elevations in the annulus 130 and in the core 18. The fuel assembly grids 40 present a higher resistance to flow than the balance of the assembly length, and the formers 59 present a higher flow resistance than the balance of the annulus 130.

Figure 5:
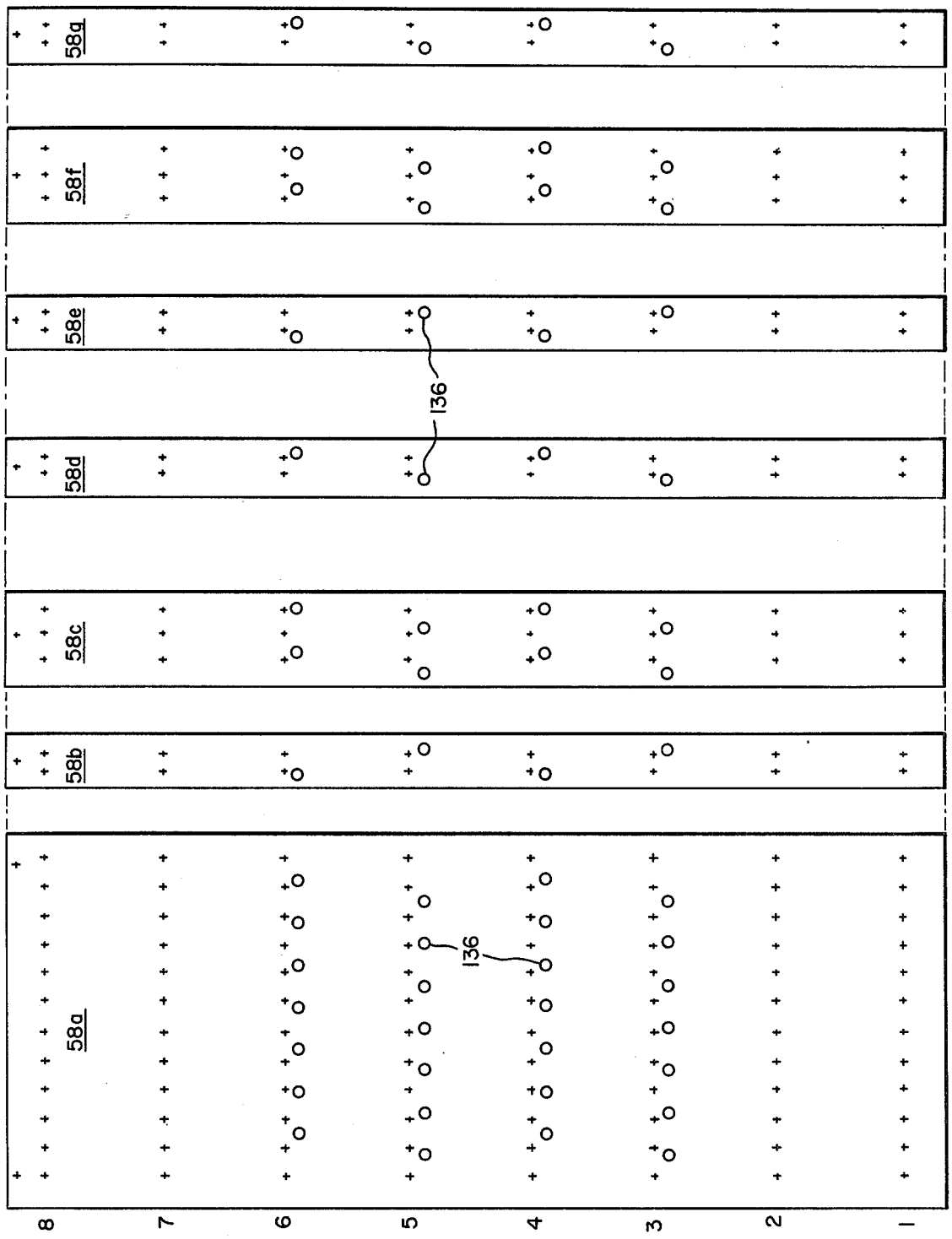
FIG. 5 is an exploded elevation view of baffle plates enclosing one-quarter of a reactor core consistent with this invention.

Flow holes 136 in the baffle plates 58 are preferably positioned just below specially selected former elevations, in the high resistance/high pressure drop area. A preferred arrangement is shown in FIG. 5. The baffle plates, shown exploded, elements 58a through 58g, enclose one quarter of the core 18, as also shown in FIG. 3. The plates 58 abut against one another, held in position by the formers 59. In the specific illustrative embodiment, the plates 58 are approximately 158 inches in height, and range in widths between about eight inches and 61 inches. The plates, which are stainless steel, are approximately 7/8 inch thick. The flow holes 136 are all two inches in diameter. The plus "+" notations of FIG. 5 represent fastener locations, at the elevations of the formers 59. As shown, the holes 136 are located only beneath the elevations of the central four formers, while elevations have been numbered 3 through 6 for purposes of description.

Figure 6:
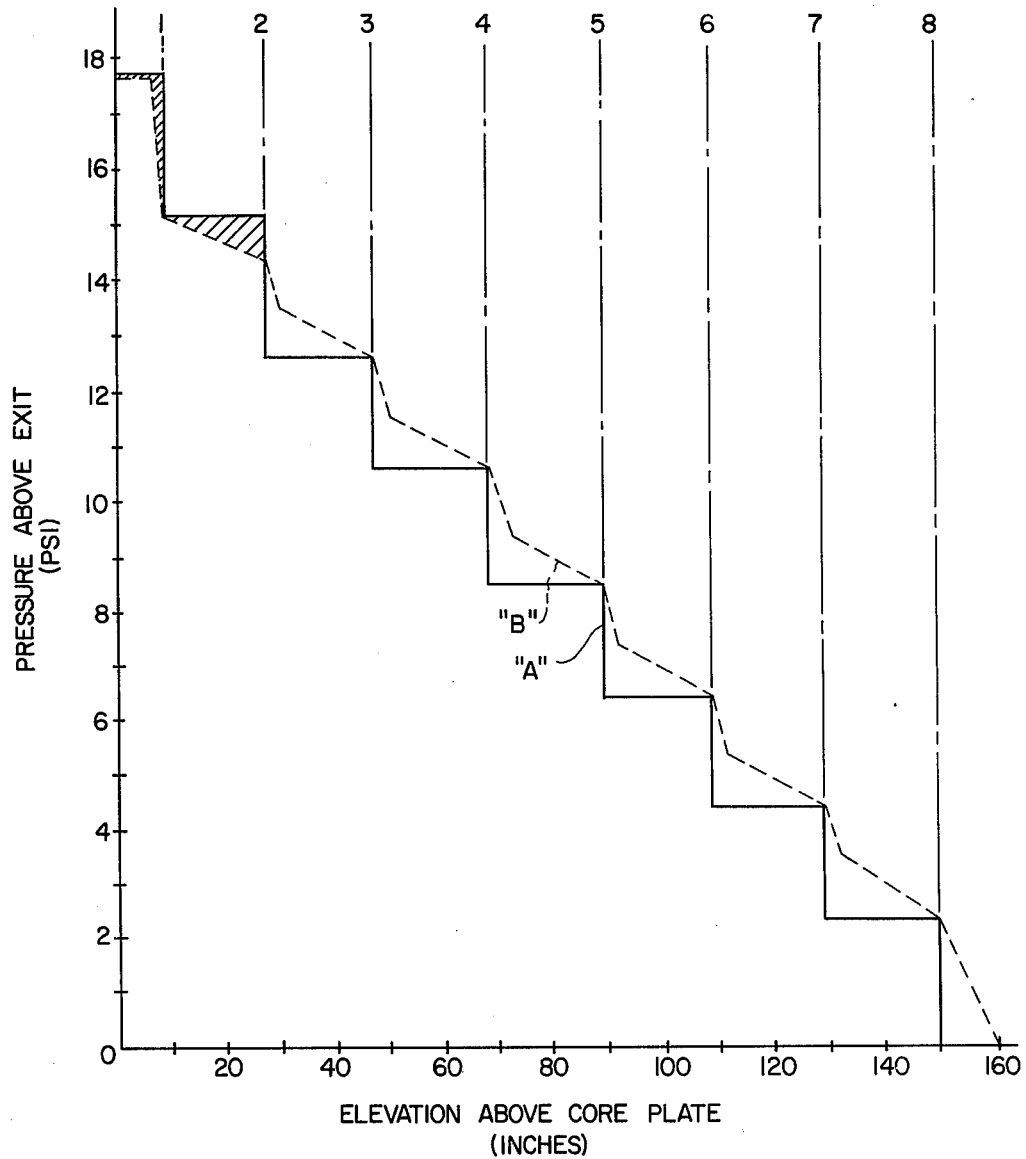
FIG. 6 is a graph plotting elevation, in inches, above the core plate (X-axis) versus pressure, in pounds per square inch (Y-axis).

The objective of the sizing and positioning of the holes 136 is to minimize the pressure differentials and thus cross flow through the holes 136. The results of the illustrative arrangement of FIG. 5 are shown in FIG. 6. It should here be noted that since the bypass flow in the annulus 130 is relatively small, no matter what flow resistance configuration is used in the annulus 130, the pressure gradient vertically through a given core 18 is fixed. In other terms, the pressure drop through the core is essentially a constant, and cross flow through the baffle plates 58 can be minimized by orientation as provided herein.

In FIG. 6, plot "A" represents the analytically determined pressure in the annulus 130 for the illustrative reactor system. The numerals 1 through 8 represent the elevations of the formers 59 and grids 40. As shown, there is a step change in pressure at each baffle elevation. Plot "B" represents the pressure in the core area. Except for the cross hatched area between locations 0 and 2, the pressure in the core 18 is always greater than the pressure in the annulus 130. By positioning the baffle flow holes 136 below the elevations 3, 4, 5, and 6, any cross flow will be from the core 18 to the annulus 130, thereby alleviating the potential for fuel rod 36 damage as a result of impinging cross flow into the core 18 through gaps formed between adjacent baffle plates. Flow holes 136 may also be positioned at additional, or alternate, elevations below specific formers, although the regions in which the conditions of the coolant flow and pressure drop are likely to be less certain are at the boundaries, at about inlet elevation 1 and outlet elevation 8. Analytical determinations have shown that incorporation of this invention also reduces the maximum pressure differential between the core 18 and the annulus 130 under assumed accident conditions by a factor of approximately four.

It is evident therefore, that placement of the formers at the same elevations as fuel assembly grids in conjunction with orientation of baffle flow holes beneath selected former elevations, results in alleviation of cross flow impingement on the fuel assemblies while eliminating overpressurization in the baffle annulus under major accident conditions. The invention also performs the required function of cooling the core barrel, baffles and formers. It will also be apparent that many modifications and variations are possible in view of the inventive teachings. For example, the size and number of baffle holes may be changed as long as the holes are all at about the same elevation between each pair of formers. Holes may also be added at upper and lower elevations, and/or deleted from the middle elevations. The main principle is to size and orient the formers, the former flow openings, and the baffle flow holes to minimize pressure differentials during normal operation and assumed accident conditions. Further, the former or grid spacing may also be modified, preferably within the constraint that only one grid is located between adjacent baffle flow hole elevations. Similarly, it is preferable that only one elevation of baffle flow holes is positioned between adjacent grid elevations. Other modifications are also possible, and it therefore is to be understood that within the scope of the appended claims, the invention may be practiced other than as specifically described.

We claim:

1. Lower core support structure apparatus for the core of a nuclear reactor circulating a liquid coolant, said core including a plurality of fuel assemblies having grids spaced at preselected elevations along the assembly length, said apparatus comprising:
   a. a plurality of formers disposed about said core at only said preselected elevations, said formers including two upper formers, two lower formers, and central formers disposed between said upper and lower formers, and,
   b. a plurality of baffle plates disposed between the outer periphery of said core and said formers, affixed to said formers, each said baffle plate being impervious to coolant flow therethrough except for flow openings disposed through each said baffle plate positioned along horizontal planes each spaced immediately beneath one of a selected plurality of said central formers to provide fluid communication between said core and the region about the outer periphery of said baffle plates 2. A nuclear reactor having a lower internals structure for supporting and guiding coolant flow through the fuel assemblies of said reactor, said assemblies having grids at preselected elevations, said structure comprising:
   a. a generally cylindrical core barrel,
   b. a perforated core support plate affixed to the bottom portion of said barrel, said assemblies seated on said plate,
   c. a plurality of horizontally disposed formers including two upper formers, two lower formers, and central formers affixed to said barrel at only said preselected elevations by horizontal fasteners positioned at each former elevation, and
   d. a plurality of vertically disposed baffle plates affixed to said formers by horizontal fasteners positioned at each former elevations, each said baffle plate being impervious to the flow of coolant therethrough except for a plurality of horizontally disposed flow openings therethrough, each said opening positioned along horizontal planes each disposed closely beneath one of only a selected plurality of the central formers.

3. An improved baffle plates-and-formers assembly for the reactor internals of a liquid cooled nuclear reactor, said reactor including a plurality of reactor core nuclear fuel assemblies vertically disposed within a core barrel of said internals, said fuel assemblies including eight grids spaced along the assembly length, said baffle and former assembly disposed between said barrel and said fuel assemblies, wherein the improvement comprises eight formers each positioned at the same elevation as each respective grid, and wherein each said baffle plate is impervious to flow of said liquid therethrough except for a plurality of flow holes through each said baffle plate along horizontal planes each disposed directly below each of the central four formers.

* * * * *